United States Patent Office 2,754,728
Patented July 17, 1956

2,754,728

PAINTABLE HARDBOARD AND PROCESS OF MAKING THE SAME

William J. Runckel and George R. Bethel, Hood River, Oreg.

No Drawing. Application November 17, 1951, Serial No. 256,966

13 Claims. (Cl. 92—39)

This invention relates to hardboard of improved paintability, i. e., to a readily paintable product formed by consolidating a mat of wood fiber or other lignocellulose particles to a substantial density.

Almost all commercial hardboards fabricated by consolidating defiberized wood or characterized by having surfaces that are not well suited for coating with paint and other coating materials. This deficiency is attributable to several factors. Principal among these is the fact that since the hardboard has a surface of non-uniform absorption powers, the paint penetrates unevenly so that a non-uniform painted surface results. Also, since the wood of which the hardboard is made is heterogeneous in character and may include bark particles, the hardboard surface is non-uniform in color and difficult to cover with paint. It, therefore, is a principal object of the present invention to provide a hardboard having a paintable surface, i. e., a surface which may be covered easily and uniformly with paint and similar coating materials.

It is another important object of the present invention to provide a hardboard having a high degree of water resistance.

Still a further object of the present invention is the provision of a hardboard of improved strength.

Another object of this invention is the provision of a hardboard which does not pit during use, even though it may contain a substantial proportion of bark.

A further object of the present invention is the provision of a hardboard of high dimensional stability which does not warp with use.

Still another object of this invention is the provision of a hardboard product which does not stick to the screens and caul plates of the press in which it is fabricated.

Still a further object of the present invention is the provision of a process for making strong, water-resistant hardboard having a decreased tendency to warp and pit with use and which has a readily paintable surface, which process may be effectuated using inexpensive and readily available raw materials.

Generally stated, the presently described hardboard product comprises a consolidated felt of lignocellulose material having on at least one of its surfaces an application of from about 0.2% to about 5.0% by weight, based on the dry weight of the lignocellulose material, of the residue remaining after the removal of steam volatile materials and rosin from pine wood pitch. This material is known commercially as extracted pine wood pitch and is sold by the Hercules Powder Company under the name of "Vinsol" resin. It is applied to one or both faces of a felt of lignocellulose material in the selected amount, after which the felt is consolidated to the desired density.

Considering the foregoing in greater detail:

The lignocellulose material, particles of which are employed in fabricating the hardboard of this invention, preferably comprises wood, although it may also comprise various other products such as cane, corn stalks, leaves, straw, etc. These are first broken down into the form of small particles. Where wood is employed, it preferably first is chipped, and then passed through suitable apparatus for defiberizing it, i. e., reducing it to a fibrous condition.

The extracted pine wood pitch employed for the purposes of this invention, e. g. the Vinsol resin is obtained commercially as a by-product from the production of wood rosin from pine wood. The wood usually is steamed first to remove volatile oils such as turpentine and pine oil. Then it is extracted with a solvent such as hot gasoline or benzene. This separates the rosin and the Vinsol from the wood. Next the solvent is cooled, whereupon the Vinsol separates as an insoluble residue which may be separated from the supernatent liquor in any suitable manner, as by decantation or filtration.

Vinsol resin is a hard, brittle, dark-colored solid, comprising principally oxidized resin acids, oxidized abietic acid, oxidized terpenes, polyphenols, polymerized terpenes and ligneous matter. A typical commercial sample of Vinsol is a thermoplastic solid insoluble in the cold hydrocarbon solvents such as gasoline, but soluble in such solvents as alcohol. It has a softening point of approximately 210°–235° F., ball and ring method, and a penetration of 0 at 150° F., 5 at 180° F., and 7 at 210° F. (200 grams, 5 seconds). It usually is sold in the form of a fine powder, which is preferred for the purposes of this invention.

The amount of extracted pine wood pitch applied to the surface of the hardboard is critical to the success of the present invention. At least about 0.2% by weight, based on the dry weight of the lignocellulose material comprising the hardboard, must be employed in order to exert a significant effect. However, if more than about 5.0% by weight is employed, an undesirable result is produced in that the resulting hardboard has a surface which is easily scratched and defaced. Furthermore, the strength of the hardboard is reduced materially and the surplus resin fouls the press.

It, therefore, is essential that from about 0.2% to about 5.0%, based on the dry weight of the lignocellulose material, be applied to at least one surface of the hardboard for the successful execution of the present process. A preferred range comprises from about 1% to about 2% by weight, and in many instances it is preferred to apply a somewhat larger amount to the face of the board than to its back. Thus, about 2% by weight of the extracted pine wood pitch may be applied to the board face, while about 1% by weight may be applied to its back with particular advantage, as will appear more fully hereinafter.

The mats or felts from which the hardboard products are produced may be formed using either dry forming or wet forming techniques. In the former, the wood particles are formed directly into a mat without first being suspended in an aqueous medium. In the latter, a 1% to 2% aqueous slurry of the wood particles first is formed. This then is transferred to a screen in a conventional forming machine, the lignocellulose being retained by the screen in the form of a mat, and the water being drained off was expressed as percent by weight of the original weight of the sample, and the thickness swelling as percent increase of the original thickness. The strength characteristics were determined by subjecting the samples to the conventional test method for measuring the flexural strength (modulus of rupture on flexing), this being expressed in pounds per square inch.

suitable solvent, or as an aqueous emulsion. Where the commercial grade of Vinsol powder is employed, it may be dusted on the mat in the predetermined amount, first on one surface and then on the other. Preferably, the press screen is moistened with water to fill in its pores, after which the Vinsol is dusted directly on the screen. Then the mat is placed on the screen and Vinsol dusted on its top surface. Finally, the mat may be introduced into a press of conventional construction, such as a multi-opening hydraulic platen press, where it is consolidated to the desired density by the application of heat and pressure.

In the press, the Vinsol-felt assembly may be pressed at from about 300° F. to about 500° F., preferably from about 350° F. to about 450° F., and at a pressure of from about 200 p. s. i. to about 1000 p. s. i., preferably from about 500 p. s. i. to about 750 p. s. i., for a time sufficient to produce a board of the desired density. A preferred practice is to press the felt first at 750 p. s. i. for one minute, at 50 p. s. i. for two minutes, and then at 750 p. s. i. for seven minutes, the press temperature being from 350° F. to 450° F.

During the pressing operation, the Vinsol melts and flows, penetrating to a certain extent into the felt and forming a coating over the surfaces to which it has been applied. In addition, it acts effectively as a mold release compound so that the hardboard does not stick to the screen or to the platens of the press as it otherwise would. Hence, in addition to serving its coating function, it replaces the otherwise essential and costly mold release compounds, such as the silicone resins, which currently are widely employed.

The resulting product is a hardboard having surface coatings which may not be present as prominent surface layers, the Vinsol having diffused to a certain extent into the body of the hardboard, but which profoundly affect the properties of the board, making it stronger, more resistant to water, more paintable and less likely to warp and pit. In addition, it is of an improved color, being of a uniform, pleasing dark brown color, even though the component particles from which it is made may be of heterogeneous colors and dimensions which normally would impart a corresponding heterogeneous appearance to the board surfaces.

These desirable properties of the presently described hardboard are illustrated in the following examples, wherein the amount of added extracted pine wood pitch (Vinsol) is expressed in percent by weight, based on the dry weight of the wood employed in making the hardboard.

In each example the boards were made by reducing the wood to chip form. The chips then were steamed for thirty seconds at 100 pounds steam pressure and corresponding temperatures for saturated steam. The steamed material was defiberized between serrated metal discs in conventional manner. Next, the mixture was wet formed on a screen, the Vinsol resin applied, and the wet sheet pressed at 750 p. s. i. and 400° F. for ten minutes.

The one-eighth inch hardboards resulting from the foregoing procedure had a density of about 1.0 and were of a uniform brown color. The strength and water repelling qualities of each board were measured by standard test methods. The moisture absorption and thickness swelling were determined by soaking weighed samples in water at 70° F. for twenty-four hours and determining the increase in weight and increase in thickness at the end of this period. The moisture absorption then off through the screen. Additive materials, such as binders and sizing materials, may be mixed with the lignocellulose particles prior to felting them as desired.

Next, the extracted pine wood pitch, e. g., the Vinsol resin, is applied topically to the mat. It may be applied in any suitable manner, as by dusting, spraying, brushing or sprinkling it on as a dry powder, as a solution in a The results are given in Table I below.

Table I

| Example No. | Vinsol | Water Absorption, percent | Thickness Swelling, percent | Modulus of Rupture (p. s. i.) |
|---|---|---|---|---|
| 1 | 0.0% | 27.5 | 23.0 | 4,700 |
| 2 | 6% (added to beater) | 23.3 | 19.0 | 4,600 |
| 3 | 1% on face / 1% on back | 11.9 | 10.3 | 6,800 |
| 4 | 2% on face / 1% on back | 13.1 | 13.0 | 7,200 |
| 5 | 2% on face / 2% on back | 10.1 | 12.4 | 6,150 |
| | Belro [1] | | | |
| 6 | 2% on face / 1% on back | 18.8 | 12.0 | 4,700 |
| | Cascophene [2] | | | |
| 7 | 2% on face / 1% on back | 25.1 | 20.1 | 5,500 |
| | Resinox [3] | | | |
| 8 | 2% on face / 1% on back | 25.2 | 17.1 | 5,240 |

[1] Belro resin: A rosin product marketed by the Hercules Powder Co.
[2] Cascophene HP403: A thermosetting phenol-aldehyde solid resin marketed by the Borden Co.
[3] Resinox 4709RC: A thermosetting phenol-aldehyde solid resin marketed by the Monsanto Chemical Co.

From the above examples, the advantageous effects of Vinsol resin as a topical coating for hardboard are strikingly apparent. Comparing the results of Examples 1 and 3, it is seen that application of 1% Vinsol to each side of the board decreases the water absorption from 27.5% to 11.9%, decreases the thickness swelling from 23.0% to 10.3%, and increases the strength from 4,700 to 6,800 p. s. i. As is apparent from Examples 4 and 5, the strength of the product is increased even more, i. e., to 7,200 p. s. i., when 2% Vinsol is placed on the face and 1% on the back.

Comparing the results of Example 2 with those of Example 3 and 4, it is evident that the presently described desirable effects surprisingly are obtained when the Vinsol is applied as a topical or surface coating, but not when it is distributed throughout the mat as a binder. Thus, in Example 2, 6% powdered Vinsol was distributed throughout the mat by adding it to the beater. This gave a board having water absorption, thickness swelling and modulus of rupture values very little if any improvement over the values obtained when no Vinsol whatsoever was present, as in Example 1. However, when a substantially decreased amount of Vinsol was applied, but as a topical coating as in Examples 3 and 4, a very materially improved water resistance and strength were imparted to the product.

From a comparison of Examples 3, 4, 6, 7 and 8, it is seen that this effect is unique with Vinsol as a representative of an extracted pine wood pitch. In Example 6 rosin, and in Examples 7 and 8 typical commercial thermosetting phenolaldehyde resins were employed in exactly the same amount and in exactly the same quantity as was the Vinsol in Example 4. However, neither the rosin nor the phenol-aldehyde resins improved the water absorption of the product to the same extent as did Vinsol resin used in the same amount, nor did they significantly improve the strength of the board over that obtained when no resin whatsoever was applied, as in Example 1.

In addition, the hardboard products obtained by the practice of the invention, as illustrated in Examples 3 and 4, demonstrated an improved surface color, this being a uniform dark brown, and showed little tendency toward pitting and warping. Still further, their surfaces were easily painted with the ordinary naphtha base paints. The coating was uniform and there was no tendency for the Vinsol to bleed through and discolor the surface, a single coating sufficing as a prime coating.

Having now described our invention in preferred embodiments, we claim:

1. The hard, stiff board product having a paintable surface and comprising a consolidated lamina of lignocellulose having on at least one surface thereof an integrated coating comprising essentially from about 0.2% to about 5.0% by weight, based on the dry weight of the lignocellulose material, of the residue remaining after the removal from pine wood pitch of the steam volatile materials and the rosin, the body of the consolidated lamina being substantially devoid of the said residue.

2. The hard, stiff board product having a paintable surface and comprising a consolidated mat of defiberized wood having on at least one surface thereof an integrated coating comprising essentially from about 0.2% to about 5.0% by weight, based on the dry weight of the wood, of the residue remaining after the removal from pine wood pitch of the steam volatile materials and the rosin, the body of the consolidated mat being substantially devoid of the said residue.

3. The hard, stiff board product comprising a consolidated felt of defiberized wood having on each of its faces a substantially uniform application of from about 0.2% to about 5.0% by weight, based on the dry weight of the wood, of extracted pine wood pitch, the body of the consolidated felt being substantially devoid of the said extracted pine wood pitch.

4. The hard, stiff board product having a paintable surface and comprising a consolidated mat of defiberized wood having on at least one surface thereof an integrated coating of from about 1.0% to about 2.0% by weight, based on the dry weight of the wood, of the residue remaining after the removal from pine wood pitch of the steam volatile materials and the rosin, the body of the consolidated mat being substantially free of the said residue.

5. The hard, stiff board product comprising a consolidated sheet of defiberized wood having on its face surface about 2% by weight, and on its back surface about 1% by weight, of the pine wood pitch residue remaining after the removal of the rosin and the steam volatile materials from the pitch, the body of the consolidated sheet being substantially devoid of the said pine wood pitch residue.

6. The process of making a hard, stiff, board product having a paintable surface which comprises forming a mat of particles of lignocellulose material, applying to at least one surface of the mat from about 0.2% to about 5.0% by weight, based on the dry weight of the lignocellulose material, of the pine wood pitch residue remaining after removal from the pitch of the steam volatile materials and the rosin, and thereafter consolidating the mat to form the board product, the body of the consolidated mat being substantially devoid of the said pine wood pitch residue.

7. The process of making a hard, stiff, board product having a paintable surface which comprises dry forming a mat of particles of lignocellulose material, applying to at least one surface of the mat from about 0.2% to about 5.0% by weight, based on the dry weight of the lignocellulose material, of the pine wood pitch residue remaining after removal from the pitch of the steam volatile materials and the rosin, and thereafter consolidating the mat to form the board product, the body of the consolidated mat being substantially devoid of the said pine wood pitch residue.

8. The process of making a hard, stiff, board product having a paintable surface which comprises wet forming a mat of particles of lignocellulose material, applying to at least one surface of the mat from about 0.2% to about 5.0% by weight, based on the dry weight of the lignocellulose material, of the pine wood pitch residue remaining after removal from the pitch of the steam volatile materials and the rosin, and thereafter consolidating the mat to form the board product, the body of the consolidated mat being substantially devoid of the said pine wood pitch residue.

9. The process of making a hard, stiff, board product having a paintable surface which comprises forming a mat of particles of defiberized wood, applying to at least one surface of the mat from about 0.2% to about 5.0% by weight, based on the dry weight of the defiberized wood, of the pine wood pitch residue remaining after removal from the pitch of the steam volatile materials and the rosin, and thereafter consolidating the mat to form the board product, the body of the consolidated mat being substantially devoid of the said pine wood pitch residue.

10. The process of making a hard, stiff, board product having a paintable surface which comprises forming a mat of particles of defiberized wood, applying to at least one surface of the mat from about 1.0% to about 2.0% by weight, based on the dry weight of the defiberized wood, of the pine wood pitch residue remaining after removal from the pitch of the steam volatile materials and the rosin, and thereafter consolidating the mat to form the board product, the body of the consolidated mat being substantially devoid of the said pine wood pitch residue.

11. The process of making a hard, stiff, board product which comprises forming particles of defiberized wood into a felt, applying to the surfaces of the felt a uniform coating of extracted pine wood pitch, and consolidating the felt to form the board product, the extracted pine wood pitch being applied in the amount of about 2% by weight on the face surface, and about 1% by weight on the back surface of the felt, based on the dry weight of the wood, and the body of the consolidated felt being substantially free from the said extracted pine wood pitch.

12. The process of making a hard, stiff, board product which comprises forming a mat of particles of lignocellulose, dusting on at least one surface of the mat from 0.2% to 5.0% by weight, based on the dry weight of the lignocellulose, of a powder comprising essentially the pine wood pitch residue remaining after removing steam volatile materials and rosin from the pitch, and thereafter consolidating the mat to form the board product, the body of the consolidated mat being substantially free of the said pine wood pitch residue.

13. The process of making a hard, stiff, board product which comprises forming a mat of particles of lignocellulose, wetting the surface of a foraminous member, dusting on the said surface from 0.2% to 5.0% by weight, based on the dry weight of the lignocellulose, of a powder comprising essentially the pine wood pitch residue remaining after removal of steam volatile materials and rosin from the pitch, placing the mat on the dusted surface of the foraminous member, and consolidating the mat to form the board product, the body of the consolidated mat being substantially devoid of the said pine wood pitch residue.

References Cited in the file of this patent

UNITED STATES PATENTS

| | | |
|---|---|---|
| 2,033,411 | Carson | Mar. 10, 1936 |
| 2,094,709 | Kinney | Oct. 5, 1937 |
| 2,198,269 | Linzell et al. | Apr. 23, 1940 |
| 2,237,048 | Carter | Apr. 1, 1941 |
| 2,264,189 | Richter et al. | Nov. 25, 1941 |

(Other references on following page)

UNITED STATES PATENTS

| | | |
|---|---|---|
| 2,312,831 | Elmendorf | Mar. 2, 1943 |
| 2,372,433 | Koon | Mar. 27, 1945 |
| 2,416,721 | Upson | Mar. 4, 1947 |
| 2,550,465 | Gorski | Apr. 24, 1951 |
| 2,654,296 | McCorkle | Oct. 6, 1953 |
| 2,681,637 | Simpson | June 22, 1954 |

FOREIGN PATENTS

| | | |
|---|---|---|
| 472,441 | Canada | Mar. 27, 1951 |

OTHER REFERENCES

Boehm: Paper Trade Journal, May 2, 1940, pages 35–38.